(12) United States Patent
Demmer et al.

(10) Patent No.: US 6,911,148 B1
(45) Date of Patent: Jun. 28, 2005

(54) ADSORPTIVE MEMBRANE DEVICE FOR TREATING PARTICLE-LADEN LIQUID FEEDS

(75) Inventors: Wolfgang Demmer, Göttingen (DE); Dietmar Nussbaumer, Göttingen (DE)

(73) Assignee: Sartorius AG, Goettingen (DE)

( * ) Notice: Subject to any disclaimer, the term of this patent is extended or adjusted under 35 U.S.C. 154(b) by 560 days.

(21) Appl. No.: 09/936,065
(22) PCT Filed: Sep. 6, 2000
(86) PCT No.: PCT/EP00/08678
  § 371 (c)(1),
  (2), (4) Date: Sep. 5, 2001
(87) PCT Pub. No.: WO01/19483
  PCT Pub. Date: Mar. 22, 2001

(30) Foreign Application Priority Data
  Sep. 14, 1999 (DE) .......................... 199 43 921
(51) Int. Cl.[7] ............................... B01D 63/00
(52) U.S. Cl. ............... 210/321.84; 210/321.85; 210/502.1; 210/651
(58) Field of Search ................... 210/143, 263, 210/323.2, 335, 341, 321.76, 651, 321.83, 321.85, 488–490, 321.84, 502.1, 650, 321.6; 96/10, 52, 54; 55/520; 436/56, 161, 162, 177–182, 175; 422/48, 49

(56) References Cited

U.S. PATENT DOCUMENTS 4,895,806 A * 1/1990 Le et al. .................. 435/293.1
5,244,578 A * 9/1993 Ohnishi et al. ............. 210/650

* cited by examiner

Primary Examiner—W. L. Walker
Assistant Examiner—Krishnan S Menon
(74) Attorney, Agent, or Firm—Chernoff, Vilhauer, McClung & Stenzel, LLP

(57) ABSTRACT

There is disclosed a device for the simultaneous separation of particles and target substances from liquid feeds by adsorption membranes having particle-passing apertures therein.

16 Claims, 4 Drawing Sheets 6          5

ADSORPTIVE MEMBRANE DEVICE FOR TREATING PARTICLE-LADEN LIQUID FEEDS

This application is a 371 of PCT/EP00/08678 filed Sep. 6, 2000, and claims priority of DE 199 43 921.4 filed Sep. 14, 1999.

BACKGROUND OF THE INVENTION

Membrane adsorbers comprising microporous, flat membranes having chemical moieties capable of binding target substances on their surfaces such as functional groups, ligands, ion-binding sites or other reactants are well known, as is their use for separation of such target substances from liquid feeds. See WO 92 00805 A1. The liquid feed is transported through the membrane adsorber by convective transport.

Typically, membrane adsorbers are used as part of a two-step process of (1) separation of particles by centrifugation or by cross flow filtration and (2) separation of the desired bioactive substance by the membrane adsorber. In an attempt to combine the step of particle separation with separation of the target substance in a single pass through the membrane adsorber, a crossflow filtration process has been suggested using Cibacron blue-modified membrane for the isolation of the enzyme maleate dehydrogenase from E-coli and baker's yeast. 12 Bioforum 455 (1992). According to this process, the particle-laden fluid feed is ridden of cell remnants by directing the feed tangentially across one membrane layer, allowing cell fragments to remain on the membrane's surface while the target substance is collected in the membrane. After removal of the cell fragments by washing the membranes, the target substance is eluted with appropriate solvents. A disadvantage of this process lies in the non-uniform permeation of the target substance through the single membrane layer. This disadvantage can be overcome by the utilization of a spiral-wound cross-flow filtration apparatus as shown in FIG. 10 of U.S. Pat. No. 6,294,090, the pertinent disclosure of which is incorporated herein by reference. However, the process still has an additional drawback in that it requires a large driving force to provide a higher permeate flow and a sufficient overflow velocity for entrainment of the particles with the fluid feed. Otherwise, the first membrane layer would be blinded and the entire permeation process defeated.

Accordingly a primary object of the invention is the provision of a simultaneous separation of particles and target substances from liquid feeds through porous adsorption membranes, characterized by a high adsorption capacity, a substantially uniform flux and by simple construction.

BRIEF SUMMARY OF THE INVENTION

Rather surprisingly, it has been found that separation by adsorption membranes, even with liquids bearing a heavy load of particles, can take place with the use of more than one layer of porous, flat adsorption membranes so long as they are spaced apart from each other and provided with at least one, but preferably a plurality, of apertures for the passage of particles. In operation, the first such membrane layer is subjected to a pressurized liquid particle-laden fluid feed containing one or more target substances. A first portion of the feed permeates particle-free through the pores of the first layer of the membrane, whereby a portion of the target substance is adsorbed in the interior of that first membrane layer. The remaining particle-bearing portion of the feed flows through the aperture(s) of the first membrane layer into a space between the first and the second membrane layer, wherein it joins the permeate which simultaneously has penetrated the first membrane layer. The so-united portions of the feed then flow over the surface of a second membrane layer with the particle-laden portion again flowing through the aperture(s) of this second membrane layer and the particle-free portion permeating through pores of the second membrane layer. The particle-laden and particle-free portions again collect together in a space between the second and third layers, and so on, with each pass passing particles in the feed and at the same time capturing the target substance by adsorption in the membrane layers, resulting in a final permeate that is entirely or nearly entirely free of the target substance, with the particles passing through the device and being discarded. The target substance is then eluted with one or more appropriate eluting agents.

The device of the present invention can be used for separations involve particle-bearing liquids, in the fields of biotechnology, in the chemical and food industries, in water treatment or in wastewater handling. A specific example of the utility of the invention would be in the recovery of biologically active substances produced by cell cultures coupled with the removal and separation of cells and cell fragments.

DETAILED DESCRIPTION OF THE INVENTION

Figure 1:
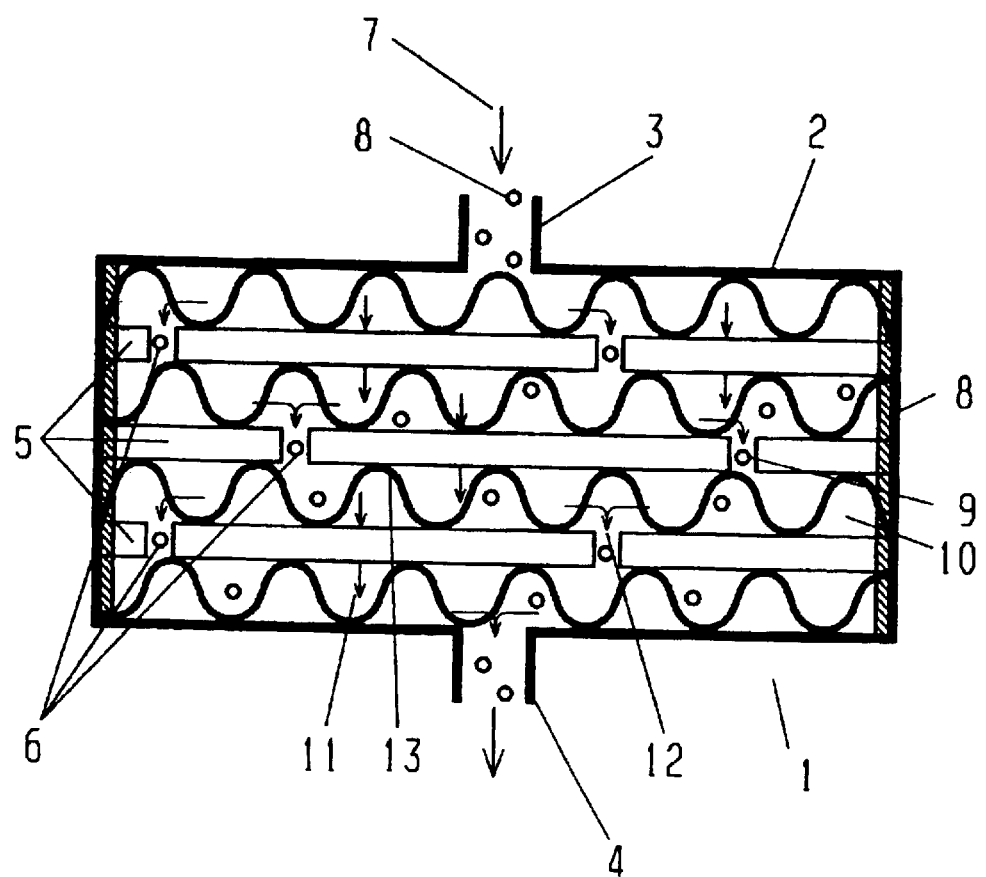
FIG. 1 is a cross-sectional schematic of an exemplary embodiment of the present invention.
Figure 2:
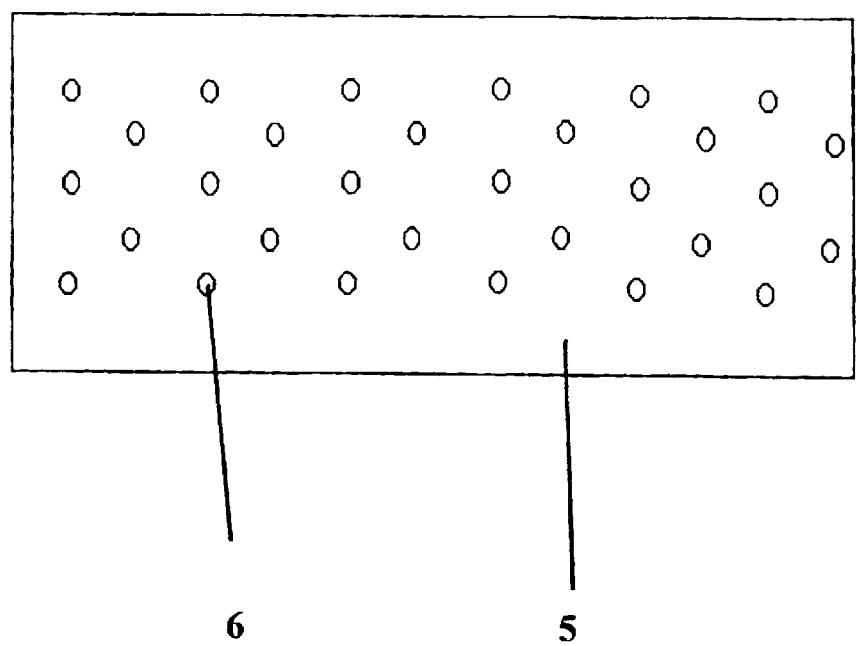
FIG. 2 is a plan view of an adsorption membrane of the present invention showing exemplary particle-passing apertures therein.

Referring to the drawings, wherein the same numerals refer to like elements, there is shown in FIG. 1 a separation device 1 comprising a housing 2 with a feed inlet 3 and a discharge or permeate outlet 4. Inside housing 2 are multiple layers of porous adsorption membranes 5 arranged so that liquid filtration feed 7 must sequentially pass through the membrane layers. Each layer of adsorption membranes 5 is provided with particle-passing apertures 6 for the passage of particles 8 borne in the liquid filtration feed liquid 7. For the sake of illustration, only a few apertures 6 are shown in FIG. 1; FIG. 2 shows an exemplary arrangement of a multiplicity of such apertures. The layers of adsorption membranes 5 are sealed fluid-tight at their peripheries near the ends of housing 2 by a sealant 9. The layers of adsorption membranes 5 are separated from each other so as to form particle-free permeate plenum 10 for the collection of particle-free permeate 11 of filtration feed 7 which has permeated through adsorption membranes 5, and also so as to permit the remaining particle-laden permeate to pass through apertures 6. The separation of the layers of adsorption membrane 5 is supported by spacers 13, which may be in the form of a particle-passing web, mesh, woven material or matting. For better flux, spacers 13 are preferably included between the walls of housing 3 and both the first and the last layer of adsorption membranes 5.

Figure 3:
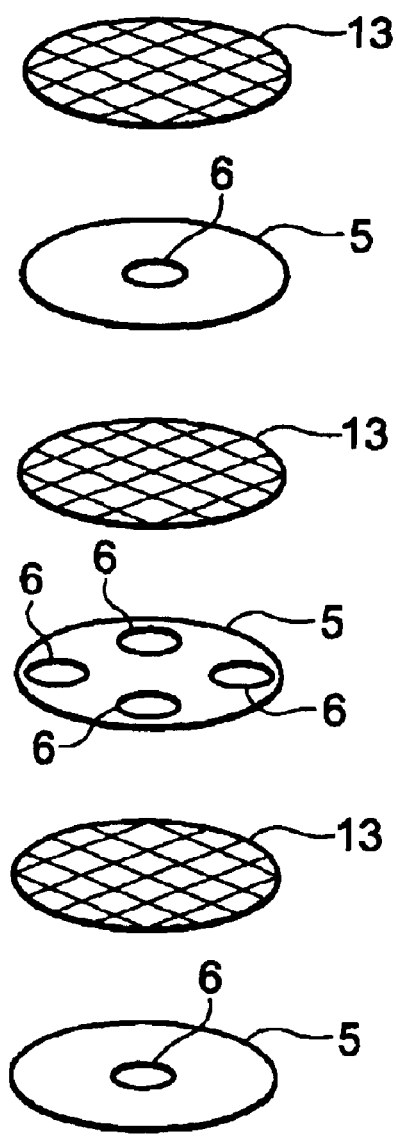
FIG. 3 is an exploded perspective view of another exemplary arrangement of particle-passing apertures, spacers and adsorption membranes in the separation device of the present invention.

The exploded perspective view of FIG. 3 shows an additional exemplary embodiment of the arrangement of apertures 6 and spacers 13 in the sequentially spaced layers of the flat adsorption membranes 5. These elements may be installed in a housing (not shown) having liquid inlet/outlet fittings and again sealed fluid-tight at their peripheries.

In the case of a plurality of apertures, the same may be arranged in a regular or irregular pattern in the membrane layers, and are sized so as to permit passage of particles in the feed. The diameter of the apertures runs as a multiple of the nominal pore diameter of the microporous adsorption membranes used in the device, with an upper limit of smaller than 100× the diameter of the largest particles in the feed. To maximize the volume of membrane available for adsorption, it is best if the apertures in neighboring layers are offset from each other. This is true even when the number of apertures in the membrane separation device is not large and/or they are small in diameter. Such apertures preferably take up from 1 to 20% of the surface area of a layer of the membrane, preferably from about 2 to about 4%. The apertures may be in virtually any shape, but are preferably in the shape of a slot or a circle, the latter shape having a diameter of from about 0.01 to about 20 mm, preferably from about 0.5 to about 2 mm. The neighboring layers of the porous flat adsorption membranes 5 are preferably separated by spacers 13 arranged parallel to one another with a gap between them, in the range of from about 0.1 to about 5 mm, preferably from about 0.2 to about 1 mm. Spacers 13 may be formed from webs, woven material or matting, so long as the material permits passage of particles.

The flat porous adsorption membranes 5 preferably have a pore diameter in a range from about 0.1 to about 10 $\mu$m, more preferably from about 3 to about 5 $\mu$m. While adsorption membranes with smaller pore diameters are insufficiently permeable for use in the 3.0 present invention, even in the case of membranes having the aforesaid pore size range, there is the potential for blockage by the impingement and build-up of smaller particles. Membranes 5 carry functional groups and/or ligands or reactants, which have the capability of binding target substances from the feed.

The apparatus can be constructed as a flat module or, in an advantageous embodiment of the invention, as a spiral wound module. A particularly preferred design is the type of cylindrical spiral wound module disclosed in U.S. Pat. No. 6,294,090, the disclosure of which is incorporated herein by reference.

EXAMPLE 1

Two meters of a 6 cm wide, strongly basic ion exchanger adsorption membrane (SARTOBINDS® Q, Sartorius AG of Goettingen, Germany), were provided with 3.5 mm diameter apertures in substantially the arrangement shown in FIG. 2, spaced apart from each other 1.8 cm and taking up 1.8% of the surface area of the membrane. This membrane strip was spirally wound together with a 6 cm wide band of polypropylene mesh to make a cylindrical module of the design shown in U.S. Pat. No. 6,294,090, the disclosure of which is incorporated herein by reference. For a First Run one liter of a particle-laden bovine serum albumin (BAS) feed solution (pH 8.3) containing particles of air-dried bakers yeast in a TRIS buffer solution (0.01 M tris (hydroxymethyl) amino methane) adjusted to pH 8.3 with concentrated HCl, was fed to the module at a rate of 0.6 L/min. Permeate from the module was conducted through a flow UV photometer which continuously recorded UV absorption at 280 nm, representing the absorption of yeast particles and cell debris.

After passage of the entire liter of liquid feed the module was flushed with the TRIS buffer until the absorption at 280 nm was nil. Subsequently, first the BSA was eluted form the module with a solution of 0.25 M NaCl in the TRIS buffer and finally the non-specifically bound yeast particles were eluted with a solution of 1 M NaCl in the TRIS buffer. During the entire procedure, no significant increase of pressure in the module occurred.

Figure 4:
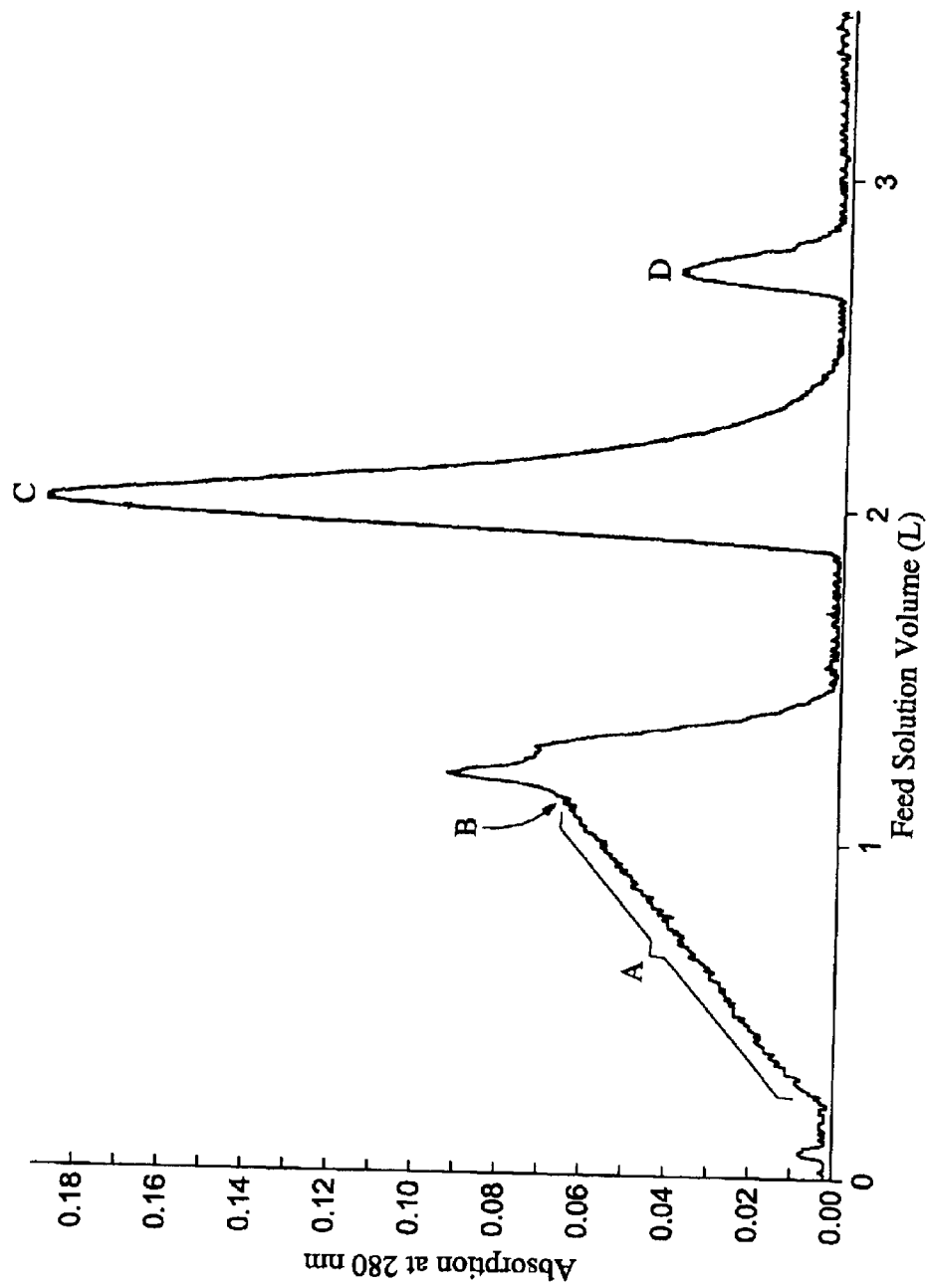
FIG. 4 is a graph of a typical material separation conducted by the separation device of the present invention.

Thereafter, the module was ready for an additional cycle, and the cycle was repeated (Second Run). FIG. 4 is a plot of the data from the foregoing separation, which shows an immediate breakthrough of the yeast particles, as represented by the steep incline A at the start of the curve. The TRIS buffer flush was begun at point B in FIG. 4 and resulted in the elution of all UV-absorbing particles. The BSA was then eluted with 0.25 M NaCl in the TRIS buffer (peak C in the curve), and then the yeast still retained in the module was desorbed by 1 M NaCl in the TRIS buffer to give the second peak D. The dynamic binding capacity (reaching of 10% of the concentration of the added BSA solution in the run-off) was 0.38 mg/cm$^2$ of membrane surface area. The static binding capacity was 0.5 mg/cm$^2$ of membrane surface area.

EXAMPLE 2

Ten grams air-dried baker's yeast were suspended in one liter of the TRIS buffer of Example 1 and this suspension was circulated in the module of Example 1 in the same manner as in Example 1 for a Second Run. The average feed pressure was 0.1 bar and did not change significantly during the 30 minutes taken to run the sample. Thereafter, 1 g BSA was added to the suspension and this mixture was run through the module. After the flushing with the TRIS buffer as described in Example 1, the BSA was eluted with a solution of 0.25 M NaCl in the TRIS buffer. At this point, 0.41 g BSA was recovered, showing a 48% reduction in static binding capacity due to yeast particles occupying binding sites on the adsorption membrane.

The results from the First and Second Runs are summarized in the tables below.

| Fraction | Volume (L) | Absorption (280 nm) | Turbidity | BSA (g) | Recovery of BSA (%) |
| --- | --- | --- | --- | --- | --- |
| First Run | | | | | |
| Feed sol. | 1 | 0.6 | + | 1 | — |
| 0.25 M NaCl | 0.58 | 0.8 | − | 0.80 | 80 |
| 1 M NaCl | 0.5 | NM | + | NM | — |
| Second Run | | | | | |
| Feed sol. | 1 | 0.6 | + | 1 | — |
| 0.25 M NaCl | 0.58 | 0.66 | − | 0.64 | 64 |
| 1 M NaCl | 0.5 | NM | + | NM | — |

NM = not measured

EXAMPLE 3

For a Third Run, the module of Example 2 was then flushed with a 1 M NaCl solution in the TRIS buffer and then with a 1 M NaOH solution and allowed to stand for 10 minutes so as to remove the bound yeast particles and so regenerate the binding capacity of the adsorption membrane. Subsequently the module was again flushed with 1 M NaOH followed by flushes with solutions of 1M NaCl and with the TRIS buffer. The module was again charged with BSA. The static binding capacity stayed at 90% of the 0.5 mg/cm$^3$ value recorded for the First Run of Example 1. The results from the Third Run are summarized in the table below.

| | | Third Run | | | |
|---|---|---|---|---|---|
| Fraction | Volume (L) | Absorption (280 nm) | Turbidity | BSA (g) | Recovery of BSA (%) |
| Feed sol. | 1 | 0.6 | + | 1 | — |
| 0.25 M NaCl | 0.5 | 1.06 | − | 0.86 | 86 |
| 1 M NaCl | 0.5 | NM | + | NM | — |

NM = not measured

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A device for the simultaneous separation of particles and at least one target substance from a particle-laden liquid feed comprising:
   (a) a housing having a liquid feed inlet and a permeate outlet for the discharge of permeate that is substantially free of said at least one target substance; and
   (b) at least two adjacent porous adsorption membrane layers sealed fluid-tight in their peripheries and spaced apart from each other and having at least one aperture in each layer, with each aperture sized to be smaller than 100 times the diameter of the largest particles in the feed, so as to permit intermixing of (i) the liquid feed containing particles and said at least one target substance and (ii) said permeate wherein said adsorption membrane layers carry at least one binding group capable of binding at least one of said at least one target substance, said binding group being selected from the group consisting of a functional group, a ligand and an ion exchange site.

2. The device of claim 1 including at least one spacer between said at least two adjacent membrane layers.

3. The device of claim 2 wherein said adjacent membrane layers are substantially parallel to each other.

4. The device of claim 3 wherein said adjacent membrane layers are separated from each other by a distance of from about 0.1 to 5 mm.

5. The device of claim 4 wherein said distance is from about 0.2 to about 1.0 mm.

6. The device of claim 2 wherein said at least one spacer comprises a material selected from the group consisting of a web, a mesh, a woven material and matting.

7. The device of claim 1 wherein said at least one aperture in said at least two adjacent membrane layers are offset from each other.

8. The device of claim 1 wherein said at least one aperture takes up an area of up to about 20% of the surface area of said at least two membrane layers.

9. The device of claim 8 wherein said area is from about 2 to about 4%.

10. The device of claim 1 wherein the shape of said at least one aperture is selected from a slot and a circle.

11. The device of claim 10 wherein said at least one aperture is in the shape of a circle and its diameter is from about 0.01 to about 20 mm.

12. The device of claim 11 wherein said diameter is from about 0.5 to about 2 mm.

13. The device of claim 1 wherein said membrane layers are spiral wound.

14. The device of claim 13 wherein said membrane layers are enclosed within a module.

15. The device of claim 1 wherein said membrane layers have a pore diameter ranging from about 0.1 to about 10 $\mu$m.

16. The device of claim 15 wherein said pore diameter is from about 3 to about 5 $\mu$m.

* * * * *

UNITED STATES PATENT AND TRADEMARK OFFICE
CERTIFICATE OF CORRECTION

PATENT NO. : 6,911,148 B1
DATED : June 28, 2005
INVENTOR(S) : Demmer et al.

It is certified that error appears in the above-identified patent and that said Letters Patent is hereby corrected as shown below:

<u>Column 3,</u>
Line 35, delete "3.0".
Line 60, correct "BAS" to read -- BSA --.

<u>Column 5,</u>
Line 3, delete "form" and insert -- from --.

Signed and Sealed this

Twenty-seventh Day of September, 2005

JON W. DUDAS
*Director of the United States Patent and Trademark Office*